June 6, 1961

J. B. FUNK, JR 2,987,203

BOAT-CARRYING TRAILER

Filed May 14, 1956

INVENTOR
J. B. Funk, Jr.

BY
Rockart & Bartholow

ATTORNEYS

June 6, 1961  J. B. FUNK, JR  2,987,203
BOAT-CARRYING TRAILER
Filed May 14, 1956  6 Sheets-Sheet 2

INVENTOR
J. B. Funk Jr.
BY
ATTORNEYS

June 6, 1961 J. B. FUNK, JR 2,987,203
BOAT-CARRYING TRAILER
Filed May 14, 1956 6 Sheets-Sheet 3

INVENTOR
J. B. Funk, Jr.
BY Rockwell & Bartholow
ATTORNEYS

June 6, 1961

J. B. FUNK, JR 2,987,203

BOAT-CARRYING TRAILER

Filed May 14, 1956

INVENTOR

J. B. Funk, Jr.

BY

ATTORNEYS

United States Patent Office 2,987,203
Patented June 6, 1961

2,987,203
BOAT-CARRYING TRAILER
James B. Funk, Jr., Fairfield, Conn., assignor to The Bassick Company, Bridgeport, Conn., a corporation of Connecticut
Filed May 14, 1956, Ser. No. 584,788
3 Claims. (Cl. 214—506)

This invention relates to boat-carrying trailers, and more particularly to those of the type in which a bed or frame can be lowered when the boat is to be launched and raised when the trailer is reloaded.

An object of the invention is to overcome objections to trailers of this general type which are now in use, and provide a practical trailer structure which is easily and conveniently operable in carrying the boat, loading and unloading it, and launching and retrieving it.

Another object is to provide a relatively simple and inexpensive trailer for the indicated purpose, in which the lifting and lowering of the bed can be accomplished very conveniently and with the exertion of a minimum amount of effort on the part of the operator.

A further object is to provide a trailer of this type which can be readily manufactured and will be relatively free from service problems.

To these and other ends the invention consists in the novel features and combinations of parts to be hereinafter described and pointed out in the following claims.

In the form of trailer shown in FIGS. 1 to 11, the structure comprises a boat-supporting element or frame comprising a beam or boom serving as a longitudinal backbone for the trailer and adapted to support the boat at points along its keel. Adjacent the rear portion of this beam is a supporting member therefor extending in a transverse direction and equipped at the ends with ground-engaging wheels, this beam-supporting member having a part with pivotal and locking relationship to the beam such that said part can be locked in an upper position in which the beam is substantially horizontal for transporting the boat, and such that when unlocked for swinging movement this part and its supported beam will drop to a boat-discharging position. The wheeled supporting member comprises upper and lower tubular cross members in parallel relationship, spaced from each other and suitably interconnected, the pivoting axis of the swinging part coinciding with the axis of the upper cross member. The lower cross member is equipped at its ends with trailing arms to which are fixed the spindles or axles of the ground wheels of the swinging beam-supporting member. Within the ends of the lower cross member are torsion spring devices which serve as torsion springs and pivot bushings for the trailing wheel-carrying arms.

The wheeled supporting member is also provided at points near its ends with connections to two drag struts, the rear ends of such struts being connected to the lower cross member and the forward ends of said struts converging forwardly and being in supported relationship to the longitudinal beam. The forward ends of these drag struts also have connection to a hydraulic jack disposed longitudinally of and under the beam, said jack comprising a body to which the forward ends of the drag struts are connected, and further comprising a rim or piston the rear end of which is operably connected to the beam and the wheeled beam-supporting member. The hydraulic jack, as hereinafter pointed out, serves as a power member by means of which the boat-carrying frame or member, after being lowered, can be returned to its upper position.

The beam or boom, in conjunction with a part of the transversely directed wheeled member, provides a bed or main frame for supporting the boat, the said part being provided with chocks for supporting the stern portion of the boat by engagement with the bottom thereof. In the transporting position, the bed or main frame is substantially horizontal, its forward extremity being held at a predetermined elevation by being supported from the towing vehicle. For launching, the part of the transversely directed supporting member carrying the wheels can be released, as hereinafter described, so that the rear end of the bed will be tilted downwardly to a launching or discharging position.

In the drawings, the longitudinal beam or boom is indicated at 20, the wheeled beam-supporting member generally at 21, the upper tubular cross member thereof at 22, the lower tubular cross member at 23, the spindles or axles of the ground wheels at 24, the trailing arms at 25, and at 26 the torsion devices which serve as torsion springs and pivots for the trailing arms. The wheels are shown at 27, the wheel fenders at 28, the drag struts at 29, and at 30 are indicated forwardly extending arms rigidly connected to the lower cross member and pivoted to the rear ends of the drag struts. The hydraulic jack is indicated at 31, the body thereof being indicated at 32 and the rearwardly disposed ram at 33, the rear end of the ram being pivotally connected at 34 to the upper cross member 22.

The beam 20 is equipped at its forward end with a suitable coupling 35 for supporting connection to the rear end of the automobile which is to tow the trailer. In this form, the forward end portion of the beam is equipped with an upstanding post 36 which, in conjunction with a forked member 37 spaced upwardly from the beam, provides a chock engageable with the upper part of the bow of the boat. In this case the post 36 additionally serves as a support for a winch 38 illustrated as being of the hand-operable type. On the upper face of the beam rearwardly of post 36 is a pad 39 adapted to engage the keel. At the rear end of the beam the latter is equipped with a roller device 40 having two rollers that, under certain conditions, engage the bottom of the craft at opposite sides of the keel.

In addition to the hull-positioning means just described, the trailer is provided with adjustable chock members 41 suitably mounted on the upper part of the wheeled support or frame 21. These chocks 41 may be removably and adjustably positioned on the upper cross member 22, and they may have bodies 42 engageable with lower hull surfaces at opposite sides of the keel in a region somewhat forwardly of the transom. In the form shown, the parts 42 of these chocks are adapted to swing in a transverse vertical plane so that they can be accommodated to the hull surface, and these are pivoted parts carried by members 43 straddling the cross member 22 and adapted to be fixed in position along the cross member 22 by suitable clamping devices 44. By loosening one of the clamping devices 44 the associated chock member or plate swingably mounted on the member 43 may be moved lengthwise of the cross member to the desired position and then clamped in place.

Figure 5:
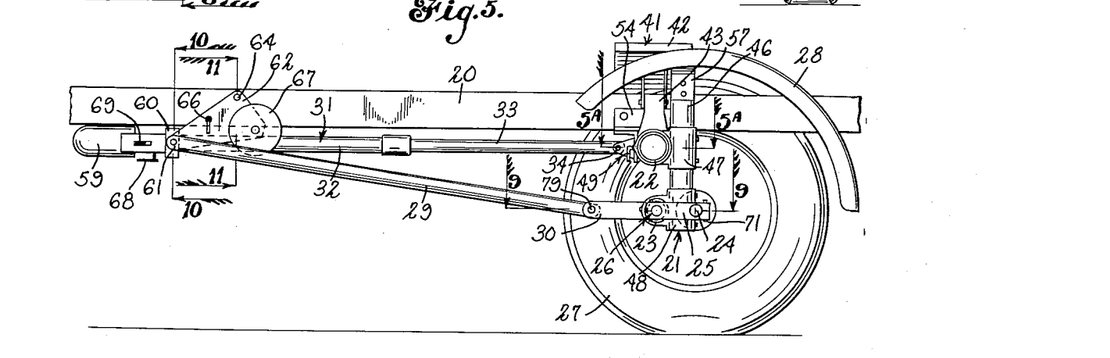
FIG. 5 is an enlarged side elevation of a part of the rear portion of the trailer showing it in coat-carrying position, the wheel at the side toward the observer being omitted.
Figures 5A, 6:
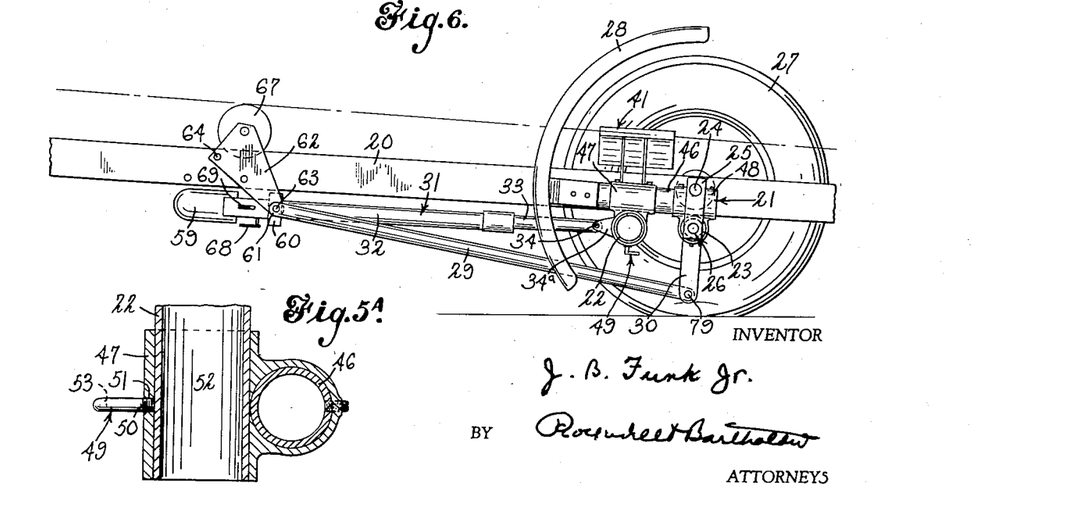
FIG. 5A is an enlarged section on line 5A—5A of FIG. 5.
FIG. 6 is a view similar to FIG. 5 showing the parts in position for launching.

The beam or backbone member 20 is illustrated as consisting of a hollow sheet metal member of rectangular cross section under which is positioned and attached the upper part of the beam-supporting frame 21. This frame 21 comprises, as above mentioned, the upper and lower cross members 22 and 23, these being in the form of tubes. The upper tube 22 is of somewhat larger diameter than the lower tube, and in the boat-carrying position has its axis somewhat forwardly of that of the lower tube, as shown in FIG. 5. The frame 21 further comprises relatively short upright tubular members 46 by means of which the end portions of the tubes 22 and 23 are interconnected. Each tubular piece or section 46 is attached to one end of cross member 22 by a cross fitting 47 and to one end of the cross member 23 by a cross fitting 48. Each fitting 47 consists of two tube portions at right angles to each other engaging the cross member and the vertical member of the frame, and the vertical frame or member is clamped by ordinary clamping screws in its tubular socket (see FIG. 5A), but the connection between cross member 22 and its part of the cross fitting is provided with a releasable clamp 49. In this form the releasable clamp 49 consists of a screw 50 having threads engaging a threaded hole 51 in cross fitting 47, and having an end portion adapted to be forced against member 22 to lock the fitting 47 in position. The screw member is provided with a handle portion 53 by means of which it may be manipulated for the purpose of releasing fitting 47 and its associated parts from the cross member.

Figure 4:
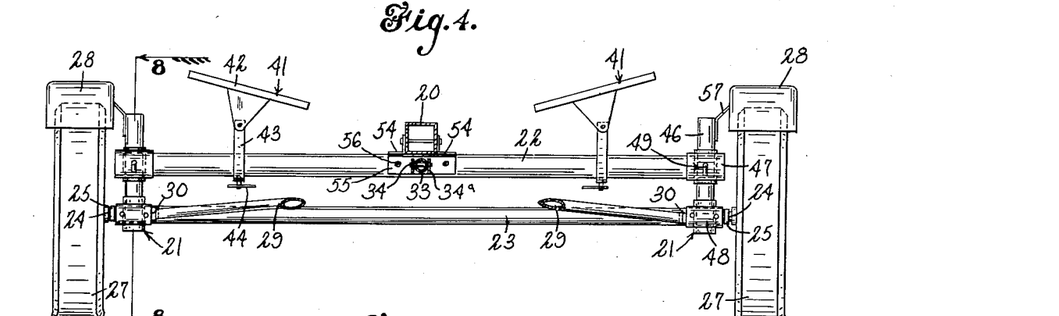
FIG. 4 is an enlarged section on line 4—4 of FIG. 3.
Figure 7:
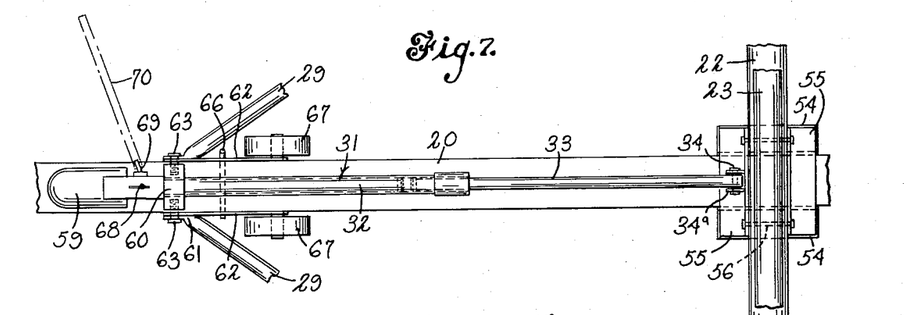
FIG. 7 is a bottom plan view of a rear portion of the trailer.
Figure 8:
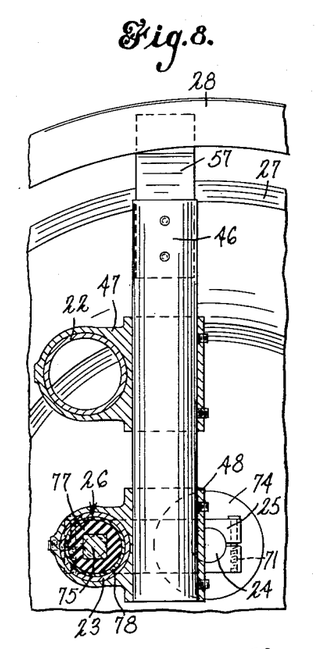
FIG. 8 is a section on line 8—8 of FIG. 4.

The beam 20 is fixed to the cross member 22 at the middle portion of the latter in the relationship shown in FIG. 4 so that the lower surface of the beam rests on the cross member. This is done preferably by means of angle plates 54 bolted to the sides of the beam, as shown in FIG. 4, and bolted to underlying angle plates 55 which are bolted to member 22 forwardly and rearwardly of the latter by bolts 56 (FIG. 7). It has been previously stated that the rear end of ram 33 is connected to the cross member 22 at 34. This connection comprises a pivot pin passing through the rear end of the ram and through ears 34ª provided on the forward angle plate 55.

The cross fitting 48 engages the lower end of the adjacent upright 46 and has a smaller tubular part engaging the cross member 23, and both members 23 and 46 are clamped in this cross fitting by ordinary clamping screws.

At its upper part the upright 46 carries a bracket 57 which serves as an attaching member for the wheel fender 28.

It has been stated that the forward ends of the struts are in supported relationship to the longitudinal beam and that these ends are connected to the body of the hydraulic jack. The arrangement of these parts is shown particularly in FIGS. 5, 6, 7 and 11. Somewhat rearwardly from the head portion 59 of the jack, the jack carries a block 60 to which are pivoted at opposite sides of the jack the forward extremities 61 of the struts and also vertically swingable supporting plates 62 mounted at the opposite side faces of the beam. These plates 62 are preferably of triangular shape, and at one of the corners of each plate the end of a drag strut is pivoted to the plate and to the block 60. This can be accomplished conveniently by means such as a bolt 63 extending through registering holes in the plate and in the drag strut and screwed into the side of the block 60, as shown in FIG. 7. Each plate 62 is pivoted to the beam by means such as a pivot pin 64 extending through the plate at an upper corner (FIG. 5) and into a socket in the side of the beam. The pin 64 pivots the plate so that it can swing from the position shown in FIG. 5 to that shown in FIG. 6. In the position of FIG. 5, a locking pin 66 extends through holes in the plates and through a hole in the beam so as to support both plates in the position shown. At the rearward corner of each plate is mounted a boat-supporting roller 67, each roller being located adjacent a side face of the beam and the two rollers being engageable with the bottom of the boat at opposite sides of the keel, as hereinafter described. The body of the hydraulic jack is provided forwardly of the block 60 with a hand-operable control valve 68 used for releasing pressure, and is also equipped with a suitable pumping or pressurizing device 69 (FIG. 7). For pumping up the jack when desired, a removable handle, such as indicated by dotted lines at 70, can be applied to the pumping means.

Reverting to the mounting for each of the wheels 27, it is noted that each wheel spindle or axle 24 is suitably mounted at its inner end in the adjacent trailing arm 25 by being clamped by suitable means such as a bolt 71 in a socket portion 72 of the arm. A suitable spacer 73 is preferably placed over the spindle between the arm and the body portion 74 of the wheel. At the forward end of the arm (FIG. 9) a rod or bar 75, extending into the cross tube 23, is fixed to the arm in a suitable manner, as by having a threaded extension on the bar screwed into the arm and by providing a tightening bolt 76. The bar 75 may be of square cross section and it has bonded thereto a conforming and surrounding rubber sleeve 77, this sleeve being encased in and bonded to a bushing 78. This bushing 78 is fixed in the tube 23 by appropriate means, as by fastening screws carried by the adjacent cross fitting 48 and engaging holes in the tube 23 and in the bushing. By this construction a pivot bushing is provided for each trailing arm adjacent the forward end of the arm, and also a torsion spring device acting on the arm for returning it to normal position after each deflection caused by a rough road surface. This construction also permits a satisfactory shock-absorbing device to be combined conveniently with the swinging member that permits raising and lowering of the trailer bed.

Figure 9:
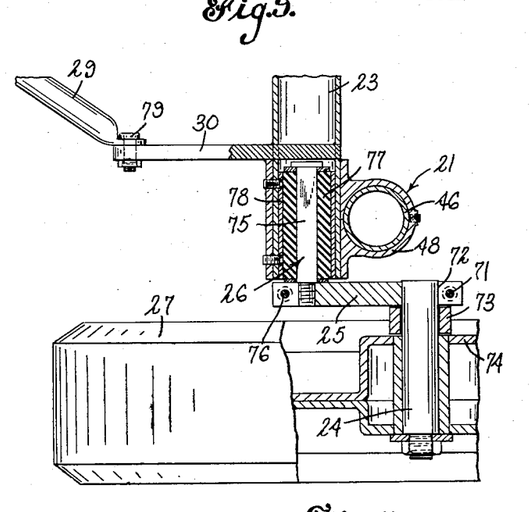
FIG. 9 is a section on line 9—9 of FIG. 5.
Figure 10:
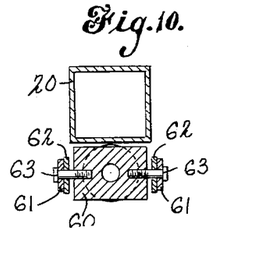
FIGS. 10 and 11 are, respectively, sections on lines 10—10 and 11—11 of FIG. 5.
Figure 11:
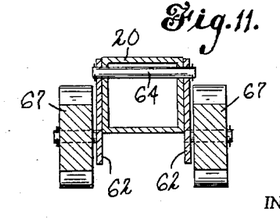

In this form, as will be noted from FIG. 9, the adjacent drag strut is connected pivotally by a pivot 79 to the arm 30 rigidly attached to the cross tube 23. This arm may have its rear portion extended through and fixed in diametrical holes in the cross tube located adjacent the cross fitting 48, the arm 30 being abutted against or in close proximity to the horizontal tubular part of the cross fitting.

Figures 1, 2:
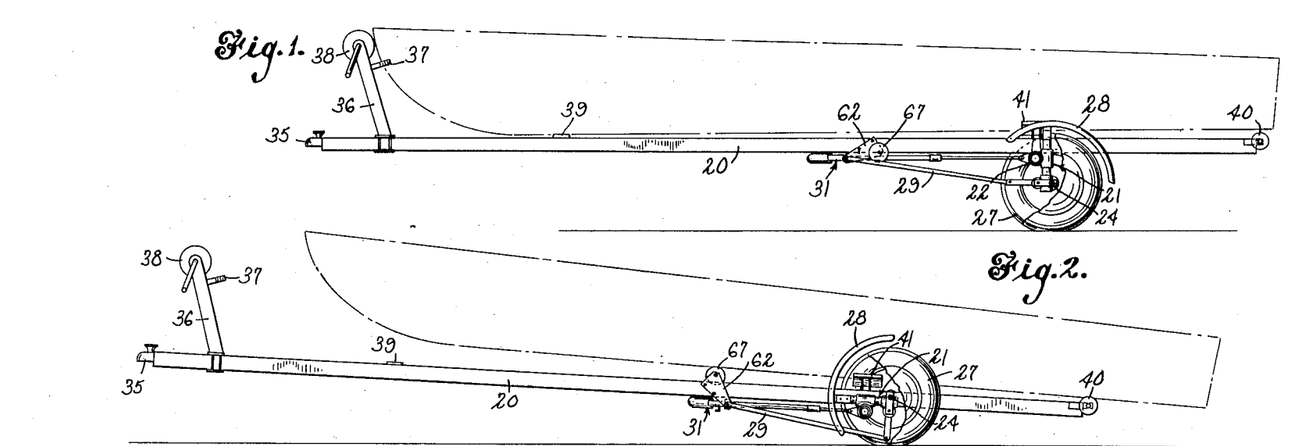
FIG. 1 is a side elevation of a trailer embodying the invention, the same being shown in boat-carrying position with one of the wheels broken away.
FIG. 2 is a similar view showing the bed or main frame in a lowered position for launching.
Figure 3:
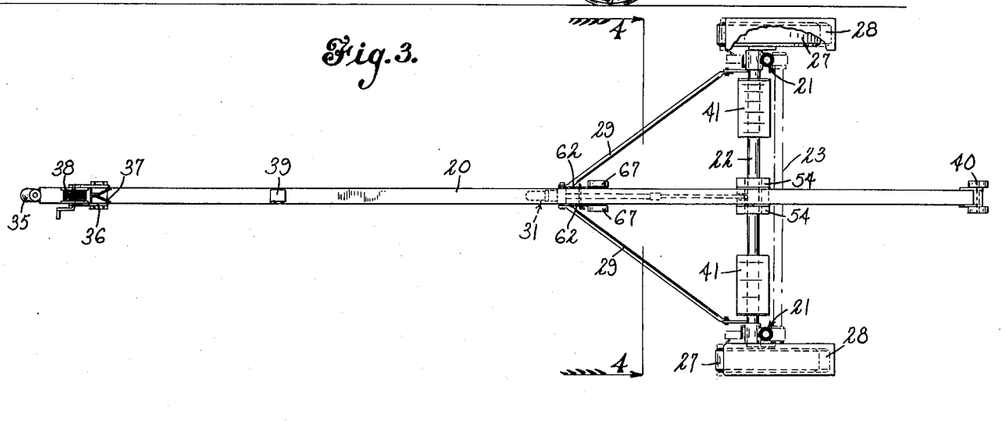
FIG. 3 is a plan view, with parts broken away, showing the trailer in boat-carrying position.

The boat-carrying or traveling position is shown in FIG. 1, and in this position the boat is supported by engagement of the bow with the bow chock 37, the engagement of the keel with the pad 39, and by the engagement of the bottom of the hull near the stern with the cradle-forming chock plates 42. At this time the sternmost portion of the hull is spaced upwardly to a certain extent from the roller device 40 provided at the rear extremity of the beam. The parts in that part of the trailer shown in FIG. 5 are held in the position there shown by the screws 50 engaged with the upper cross tube 22, so that the swingable frame pivotally mounted on the upper cross tube will have an upright position. The locking pin 66 associated with the supporting plates 62 and their rollers 67 is in the operative position. In this position the forward ends of the drag struts and also the forward end of the jack body are held rigidly in position relatively to the beam. In this position the rollers 67 carried by the plates are located somewhat below the upper surface of the beam. In moving over a rough road the shock-absorbing devices associated with the wheels serve to cushion the road shocks in the manner previously mentioned.

To lower the trailer bed between the wheels, the locking members 49 associated with the cross fittings 47 are released by turning the handles 53 so that the cross fittings are released for turning, and locking pin 66 is withdrawn from its hole through the beam and the holes in the supporting plates 62 so as to release these plates from their upper position. The jack valve 68 is then opened by hand manipulation so as to allow the jack to collapse by rearward movement of the jack body 32 over the ram 33, the rear end of which ram is fastened to the cross member 22 in the manner previously described. As the jack body moves rearwardly over the ram, the plates 62, carrying the jack body as well as the forward ends of the drag struts, swing counterclockwise (FIG. 5) on their pivots 64, and permit the swingable part of the wheeled frame 21 to move counterclockwise (FIG. 5) about the axis of the upper cross member 22 (under the effect of the load) toward the position shown in FIG. 6, and allow the wheels to roll backward and the rear part of the beam to swing downward between the wheels. This motion is arrested when the lower cross tube 23 engages the lower surface of the beam, as indicated by the dotted lines in FIG. 6, the beam thus serving as an effective stop. This allows the rear portion of the beam to take and be held in a predetermined lower position in which launching or loading of the trailer is facilitated. In case of launching there is also an additional result, namely, that the rollers 67, which are lift rollers, are raised relatively to the beam when the beam is being lowered so as to engage the bottom of the boat and exert an upward lift on the beam relatively to the boat at a point rearwardly of the keel pad 39 and forwardly of the chock plates 42. As the lift rollers move the boat in this manner away from these forward and rear supports on the trailer frame, the boat is tilted in a manner to cause engagement of its stern portion by the rollers 40, as shown in FIG. 2, and this enables the boat to be slid rearwardly and downwardly on the lift rollers and the rearward supporting rollers, for launching. In this position the boat engaging only the said rollers will easily roll off the trailer into the water.

It is understood that in the above-described operation the wheel-equipped transverse member 21 comprising a frame having upper and lower cross tubes and upright members, interconnected by cross fittings such as employed for interconnecting tubes or rails, has a part thereof releasable so that the lower cross member and associated upright members may each swing in a vertical plane relatively to the upper cross member, which retains its rigid relationship to the beam or lengthwise frame member. This upper cross member thus provides a stationary axis on which the wheel-equipped frame member can swing as above described in order to lower the boat.

To retrieve the boat, the winch 38 is used to pull it again into position over the rollers 40 and 67 and place the bow against the bow chock. The jack valve 68 is then closed and the removable jack handle 70 placed in position and operated to force the jack body forwardly. This rotates the supporting plates 62 in a clockwise direction (FIG. 6), and thus through the jack the wheeled frame and the drag struts are moved back to the original position. At the same time the lift rollers 67 lower and the boat settles into the position shown by dotted lines in FIG. 1. The locking pin 66 is then used to lock the plates 62 in the upper position, and the lock members 49 are manipulated to lock the swinging wheeled frame in the boat-carrying position.

It is evident that the invention provides the important advantage that the trailer does not have to be immersed in the water to launch or retrieve the boat. Launching and retrieving can be done easily and conveniently by one person, and in launching and retrieving it is unnecessary to disconnect the trailer from the towing vehicle or to walk into the water. It is also apparent that with this construction a boat can be readily loaded on the trailer or unloaded when the trailer is on dry ground. This is an operation which can be done very conveniently in a boatyard, for example, and this is an advantage over conventional trailers.

The manner in which the lifting device serving to lift the boat by power at an intermediate point relatively to the bed is combined or coordinated with the drop-bed mechanism is also of importance. Furthermore, the structure of the improved trailer is relatively simple, as the trailer embodies relatively few parts additional to those of trailers lacking the herein described improvements.

Figures 12, 13, 14:
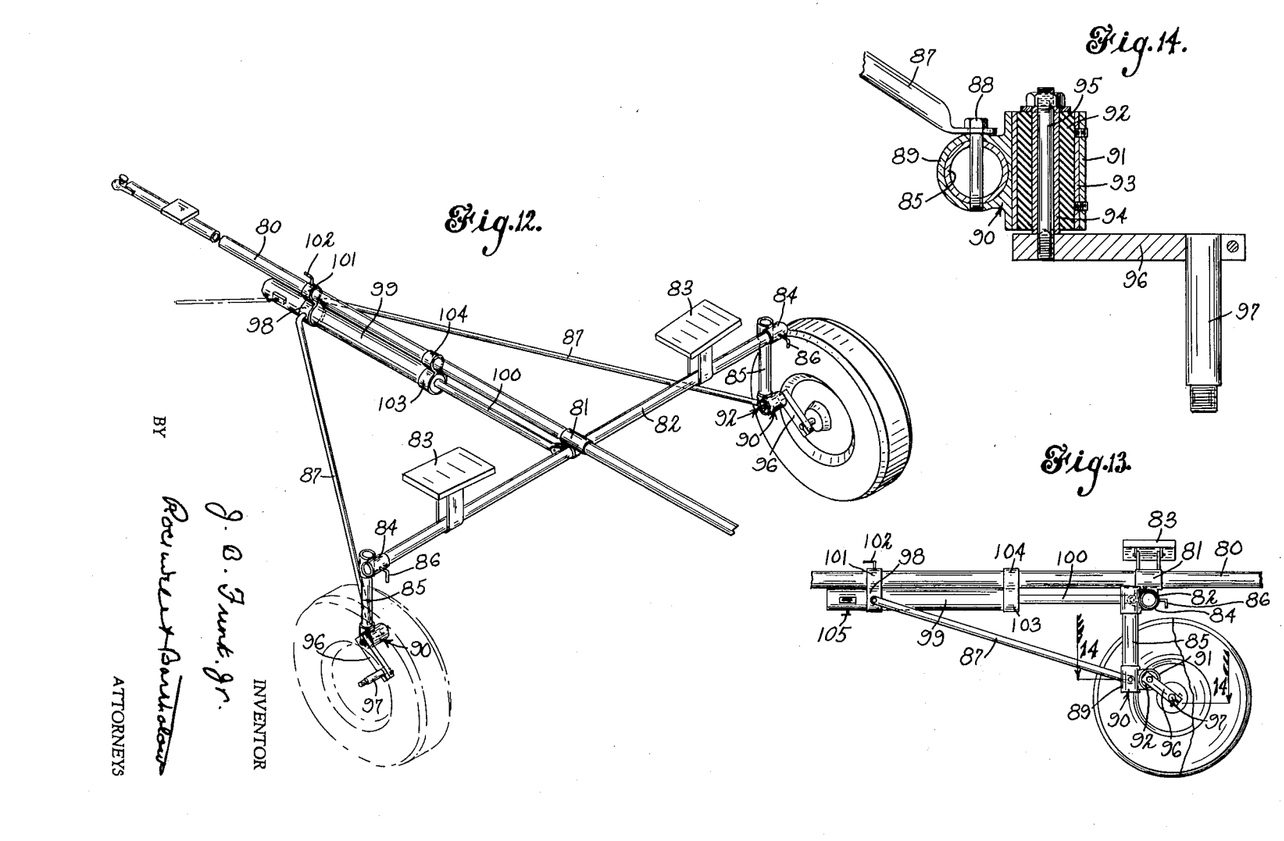
FIG. 12 is a perspective view with parts omitted, showing a modified form.
FIG. 13 is a side elevation of a portion of the trailer shown in FIG. 12.
FIG. 14 is a section on line 14—14 of FIG. 13.

In the modified form shown in FIGS. 12 to 14, some of the structural features, with their functions as above described, are retained, although there are considerable differences in detail. The longitudinal backbone member, instead of being of rectangular cross section, is a cylindrical tube, and the wheeled transverse frame member lacks the lower cross member provided on the swinging part of the frame. Further, there are differences in respect to the arrangement of the drag struts and the hydraulic jack.

Here the cylindrical beam or pole 80 has fastened to it near the rear end of the trailer, by means of a cross fitting 81, a cross tube 82. This cross member 82 is provided with chock plates 83 of suitable structure corresponding in a general way to the previously described members 42. At the ends of the cross tube 82 are cross fittings 84 receiving the ends of the tube and also receiving the upper ends of upright frames in the form of tubes 85. These fittings are provided with lock members 86 corresponding to the members 49, 50 previously described. When the lock members 86 are released the upright members 85 may swing to lower the wheels. The drag struts are indicated at 87, and their rear ends are pivoted by bolts 88 to parts 89 of lower cross fittings 90, as shown in FIG. 14. The horizontal parts 91 of these cross fittings carry interiorly, torsion bushings, generally indicated at 92, corresponding generally to the torsion bushings previously described and comprising a torsion sleeve of rubber bonded to an outer metal sleeve 93 fixed in the cross fitting. An inner sleeve 94, bonded to the rubber sleeve, surrounds a bolt 95 attached to a trailing arm 96 that carries at the rear end the wheel spindle 97.

The drag struts 87 at their forward ends are connected to a collar 98 carried by the forward part of a hydraulic jack body or cylinder 99 in which is a piston or ram 100, the rearward end of the ram being fastened to the lower part of the middle cross fitting 81. The collar 98 is provided with a loop-shaped extension 101 embracing the longitudinal beam 80 in a manner to permit longitudinal movement along said member, this extension being provided with a lock 102 for locking the ram body in position. The ram body also carries a rearward collar 103 having an extension 104 guiding the ram body along the beam 80.

FIG. 12 shows this trailer in position for carrying the boat, the locks 86 holding the cross member 82 stationary and the lock 102 holding the jack body in the position shown. For lowering the boat, these lock devices are released and a valve 105 to the jack is opened. This permits the jack body to move rearwardly as in the first-described form, with consequent dropping of the bed. The manner of effecting the raising of the bed will be obvious.

The trailer shown in FIGS. 15 to 22, inclusive, is generally similar to the form shown in FIGS. 1 to 11, inclusive, but differs therefrom in some features.

At the forward end of the longitudinal beam 20ª but somewhat rearwardly of the draft connection 35ª, a detachable caster-equipped post 106 is provided which serves the function of supporting the frame or bed in a substantially horizontal position when the trailer is disconnected from the towing vehicle. The wheeled frame, indicated at 21ª, and its mounting are generally similar to those of the first-described form, but the upper cross member 22ª lacks the hull supports 41 previously described, and rearwardly of the bow chock 37ª there are two stationary supports for the hull, one being the V-type cradle 107 and the other a stern support or cradle generally indicated at 108. The V-type cradle 107 is intended to engage the bottom at opposite sides of the keel, and this support is shown in detail in FIG. 18, where 109 is a laterally extending bracket clamped to the longitudinal beam and having pivoted thereto suitably padded supporting blocks 110. The bracket has upstanding pairs of lugs 111 in which are placed pivot bolts 112 for the blocks. The cradle 107 is clamped to the beam in a manner such that the former is adjustable along the beam. It is usually placed in a location such as shown in FIG. 15, the same engaging the bottom of the hull slightly rearwardly from the bow and at a substantial distance forwardly of the lifting rollers 67ª which correspond to the previously described rollers 67.

In this form the hydraulic jack is similar to that in the form first described, the same having a cylinder 113 connected to the swinging plates 114 in a location beneath the beam. However, the head or dome portion 115 of the jack having the lever-operated valve device is located in the manner shown in FIG. 15, the same being at the forward end of the beam from which it projects upwardly. This location of the head where it is near the draft connection and the winch is more convenient for the operator than is the location shown in FIG. 1. The head is connected with the cylinder 113 by conduits 116 supported on and extending along the beam, these conduits being connected to the cylinder by means such as flexible tubes 117 that permit the cylinder 113 to have the required longitudinal movement as the bed or frame is raised and lowered.

The stern cradle 108, mentioned above, comprises two side members supported upon the upper frame member 22ª, and a rear transverse member connected to the side members and to the rear end of the beam. The side members are indicated at 118 and these are parts of a substantially V-shaped frame the forward end of which is fastened to opposite sides of the beam 20ª by suitable fastenings 20ᵇ. The members 118 diverge rearwardly, as shown in FIG. 16, and their rear extremities are interconnected by a cross member 119 of channel shape, having its flanges pointing downwardly. The middle portion of member 119 is suitably fastened to the under surface of the beam (FIG. 17). The rear portions of the side members 118 serve to support cradle members 120. These cradle members 120 are of flanged cross section (FIG. 20), with their flanges pointing inwardly, and they are above and in line with the members 118. Their upper parts, which are preferably padded, engage the bottom of the hull at substantial distances from the keel so as to provide firm support for the stern. These cradles are preferably adjustable vertically with respect to the frame members 118 by means of adjusting plates 121 fixedly bolted to the cradles in depending relationship thereto and adjustably connected to the members 118 by clamping bolts 122 engaging slots 123 in the plates. It is advantageous to have each cradle 120 vertically adjustable from each end, and the arrangement shown in the drawings permits this. By having them adjustable from each end, the cradle may be more readily conformed to the shape of the hull bottom.

Figures 15, 16, 17, 18:
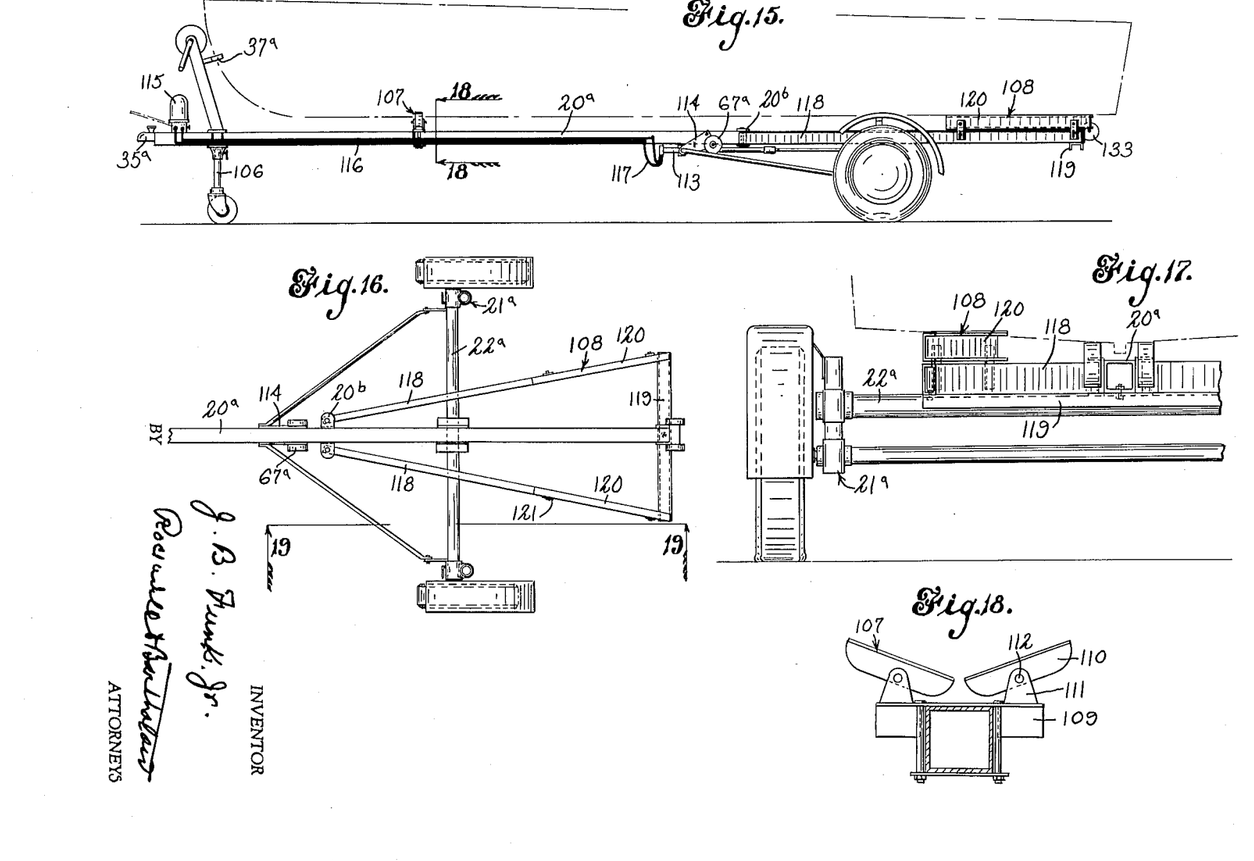
FIG. 15 is a side elevation showing a further modified form in the boat-carrying position, this form being generally similar to the form first described but differing therefrom in certain features.
FIG. 16 is a plan view of the rear portion of this trailer.
FIG. 17 is a partial rear view of the trailer in the position shown in FIG. 15.
FIG. 18 is a section on line 18—18 of FIG. 15, illustrating a V-type cradle used in this form.

As shown in FIG. 16, the cradle bars 120 are at a slight angle to the longitudinal axis of the supporting bed, and the stern support of which they are a part is of substantial width, the maximum width being at the rear extremity.

Figures 19, 20, 21, 22:
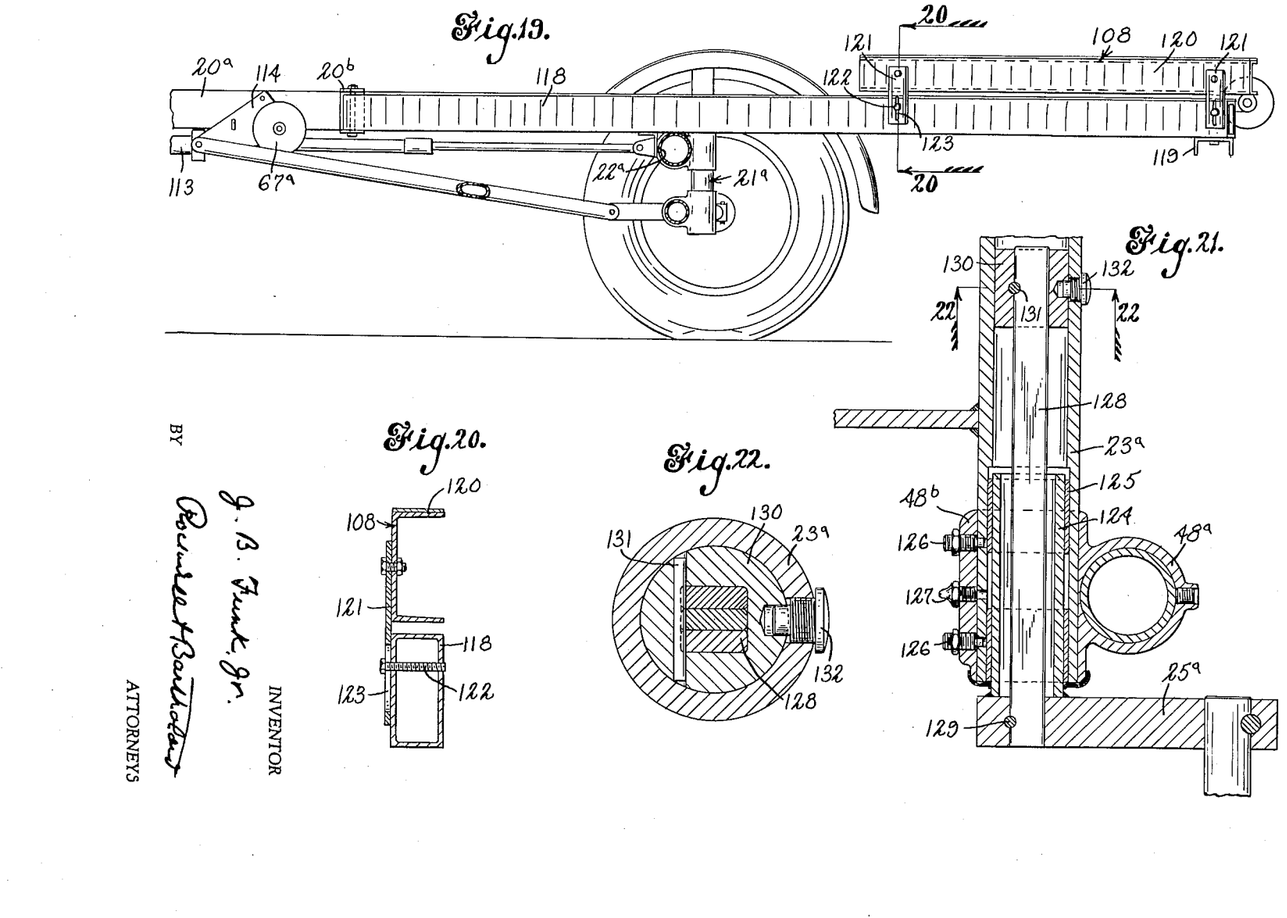
FIG. 19 is an enlarged section on line 19—19 of FIG. 16.
FIG. 20 is a section on line 20—20 of FIG. 19.
FIG. 21 is a fragmentary horizontal section showing the trailing arm pivoting means and shock absorbed employed in this structure.
FIG. 22 is a section on line 22—22 of FIG. 21.

In this form there is a different structure of the pivoting means and shock-absorbing means used in connection with the trailing arm that carries the wheel axle. As shown in FIG. 21, the trailing arm 25ª, pivoting on an axis coinciding with the axis of cross tube 23ª, has suitably fixed thereto as by welding a tubular sleeve 124 extending into the open extremity of tube 23ª and supported in sleevelike bearings 125 interposed between the sleeve 124 and the tube member. The lower cross fitting 48ª has a horizontal portion 48ᵇ in which the end portion of tube 23ª is fixed by clamping screws 126, and between the two screws 126 is a grease fitting 127 by which the bearings of the trailing-arm-carried sleeve 124 can be lubricated. Within the sleeve 124 and spaced therefrom is a laminated torsion bar 128 of substantially square cross section. One end of this bar is fixed by a pin 129 to the arm 25ª. At its opposite end the torsion bar 128 is extended into tube 23ª to engage a square hole in a cylindrical block 130 in the cross tube at some distance from the cross fitting 48ª. The end of the torsion bar is fastened in the block 130 by a pin 131. The block 130 is engaged by a screw 132 in the wall of the cross tube, so that the inner end of the torsion bar will be firmly locked against turning although its outer end is free to turn or twist. This construction provides an effective pivotal mounting for the trailing wheel-supporting arm, and up-and-down movement of the wheel requires twisting of the torsion bar from the outer end, thus cushioning the movement of the trailing arm.

In connection with the generally longitudinal cradle members under the boat at the stern portion, there are employed rollers 133 which are placed at opposite sides of the longitudinal member 20ª, as shown in FIGS. 16 and 17, and are used to give support to the bottom at opposite sides of the keel. These rollers may be supported upon suitable brackets applied to the beam extremity at opposite sides of the beam. Preferably in carrying the boat on the trailer the under part of the hull will be engaged with these rollers and also with the cradles 120. It is understood that when the bed or frame is lowered the lift rollers 67ª will engage the boat bottom at the middle portion of the latter, and exert a lifting force, facilitating launching. In launching, the stern portion of the bottom will roll along the rollers 133, which, in the traveling position, have been in engagement with the boat bottom.

In this third form of the trailer, the boat in the traveling position has upwardly spaced relationship to the beam or boom throughout the boat length, and this is advantageous particularly with reference to the resulting reduction of road shocks imparted to the hull. The cradle arrangement at the stern portion of the boat is advantageous as it gives strong support to the load and eliminates the tendency of the boat to tilt toward one side. The stern support or sub-frame 108 of the bed is very effectively supported by a wheeled frame of the kind above described.

The trailer structure may take various other forms and various structural changes may be made without departure from the principles of the invention and the scope of the claims.

What I claim is:

1. In a boat-carrying trailer, an elongated longitudinal member for supporting a boat from beneath at different points along said member, a transverse member crossing said first member and rigidly fixed thereto in a location adjacent the rear end of said first member, a swinging frame pivoted to said transverse member and having ground wheels swingable in vertical longitudinal planes, means for locking said frame in boat-transporting position with said longitudinal member directed substantially horizontally, said means being releasable to permit lowering of the rear portion of said longitudinal member, supporting plates movably connected to said longitudinal member, drag struts connected to said swinging frame and having forward ends joined with said plates, a hydraulic jack comprising telescoping members operable to raise or lower the rear portion of said longitudinal member, one of said telescoping members being fixed against lengthwise movement and the other of said telescoping members being connected to said movable supporting plates, lift rollers mounted on said plates for movement therewith during the lowering of said longitudinal member to engage the boat hull.

2. In a boat-carrying trailer the combination of an elongated longitudinal member for supporting a boat from beneath, a swinging frame including a transverse member crossing the elongated member and fixed against longitudinal movement relative thereto, the swinging frame pivotal about the axis of the transverse member and having ground wheels swingable in vertical longitudinal planes, means for locking said frame in boat-transporting position with said longitudinal member directed substantially horizontally, said means being releasable to permit lowering of the rear portion of said longitudinal member, at least one supporting plate pivotally connected to said longitudinal member, a drag strut connected at opposite ends to said swinging frame and said supporting plate, a hydraulic jack mounted between said frame and said plate, said jack operative to pivot said plate to raise or lower said longitudinal member, a lift roller mounted on said plate for movement therewith during the lowering of said longitudinal member to engage the boat hull.

3. In a boat-carrying trailer the combination of an elongated longitudinal member for supporting a boat from beneath, a swinging frame including a transverse member crossing the elongated member and fixed against longitudinal movement relative thereto, the swinging frame pivotal about the axis of the transverse member and having ground wheels swingable in vertical longitudinal planes, means for locking said frame in boat-transporting position with said longitudinal member directed substantially horizontally, said means being releasable to permit lowering of the rear portion of said longitudinal member, supporting plates pivotally mounted on said longitudinal member, drag struts connected to said swinging frame and having forward ends movably connected to said plates, a hydraulic jack comprising a telescoping cylinder and piston members operable to raise the rear portion of said longitudinal member, one of said telescoping members being fixed against lengthwise movement and the other of said telescoping members being connected to said plates, and lift rollers carried by said supporting plates for engagement with the boat hull during the lowering of said longitudinal member.

References Cited in the file of this patent

UNITED STATES PATENTS

| 2,227,762 | Ronning | Jan. 7, 1941 |
| 2,636,745 | Cartwright | Apr. 28, 1953 |
| 2,708,045 | Shontz | May 10, 1955 |
| 2,733,823 | Evans | Feb. 7, 1956 |
| 2,740,543 | Mounsdon et al. | Apr. 3, 1956 |
| 2,746,622 | Roy | May 22, 1956 |
| 2,754,129 | Eckroad | July 10, 1956 |
| 2,780,475 | Koerner | Feb. 5, 1957 |
| 2,788,908 | Lynd | Apr. 16, 1957 |